US011727679B2

(12) United States Patent
Zhu et al.

(10) Patent No.: US 11,727,679 B2
(45) Date of Patent: Aug. 15, 2023

(54) AUTOMATIC TERRAIN EVALUATION OF LANDING SURFACES, AND ASSOCIATED SYSTEMS AND METHODS

(71) Applicant: SZ DJI TECHNOLOGY CO., LTD., Shenzhen (CN)

(72) Inventors: Zhenyu Zhu, Shenzhen (CN); Honghui Zhang, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 118 days.

(21) Appl. No.: 17/330,558

(22) Filed: May 26, 2021

(65) Prior Publication Data

US 2021/0286377 A1    Sep. 16, 2021

Related U.S. Application Data

(63) Continuation of application No. 16/264,239, filed as application No. PCT/CN2016/093767 on Aug. 6, 2016, now Pat. No. 11,022,984.

(51) Int. Cl.
*G06V 20/13* (2022.01)
*B64D 47/08* (2006.01)
(Continued)

(52) U.S. Cl.
CPC ............ *G06V 20/13* (2022.01); *B64C 39/024* (2013.01); *B64D 45/08* (2013.01); *B64D 47/08* (2013.01);
(Continued)

(58) Field of Classification Search
CPC .......... B64C 2201/127; B64C 2201/18; B64C 39/024; B64D 45/08; B64D 47/08;
(Continued)

(56) References Cited

U.S. PATENT DOCUMENTS 6,909,945 B2    6/2005  Katzer
8,301,326 B2 *  10/2012 Malecki .................... G06T 7/74
                                                        342/417
(Continued)

FOREIGN PATENT DOCUMENTS

AU    2014307569 A1 *  3/2016  ......... B64C 29/0033
CA       2853546 A1 *  5/2013  ........... G06K 9/0063
(Continued)

OTHER PUBLICATIONS

Huangdalong, "Research on unmanned helicopter assisted landing based on monocular vision," *Master Dissertation of Zhejiang University*, Aug. 1, 2012.
(Continued)

*Primary Examiner* — Atul Trivedi
(74) *Attorney, Agent, or Firm* — Xsensus LLP

(57) ABSTRACT

Automatic terrain evaluation of landing surfaces, and associated systems and methods are disclosed herein. A representative method includes receiving a request to land a movable object and, in response to the request, identifying a target landing area on a landing surface based on at least one image of the landing surface obtained by the movable object. The method can further include directing the movable object to land at the target landing area.

20 Claims, 10 Drawing Sheets

(51) Int. Cl.
  *B64C 39/02* (2023.01)
  *B64D 45/08* (2006.01)
  *G06V 20/64* (2022.01)
  *G06V 20/17* (2022.01)
  *G06T 7/593* (2017.01)
  *G05D 1/04* (2006.01)
  *B64U 70/00* (2023.01)
  *B64U 101/30* (2023.01)
  *G05D 1/00* (2006.01)

(52) U.S. Cl.
  CPC ............. *G05D 1/042* (2013.01); *G06T 7/593* (2017.01); *G06V 20/17* (2022.01); *G06V 20/64* (2022.01); *B64U 70/00* (2023.01); *B64U 2101/30* (2023.01); *G05D 1/0038* (2013.01); *G06T 2207/10012* (2013.01); *G06T 2207/10028* (2013.01); *G06T 2207/10032* (2013.01); *G06T 2207/30181* (2013.01)

(58) Field of Classification Search
  CPC ...... G05D 1/0038; G05D 1/042; G06T 7/593; G06T 2207/10012; G06T 2207/10028; G06T 2207/10032; G06T 2207/30181; G06V 10/751; G06V 20/13; G06V 20/64
  USPC .......................................................... 701/16
  See application file for complete search history.

(56) References Cited

U.S. PATENT DOCUMENTS

| | | | |
|---|---|---|---|
| 9,041,915 B2 | 5/2015 | Earhart et al. | |
| 9,056,676 B1* | 6/2015 | Wang | B64F 1/222 |
| 9,087,451 B1* | 7/2015 | Jarrell | G08G 5/003 |
| 9,177,481 B2 | 11/2015 | Wang et al. | |
| 9,260,180 B2* | 2/2016 | Puyou | G08G 5/025 |
| 9,262,929 B1* | 2/2016 | Roy | G08G 5/0034 |
| 10,706,587 B1 | 7/2020 | Sorgi et al. | |
| 2006/0167599 A1* | 7/2006 | Bodin | G08G 5/025 |
| | | | 701/16 |
| 2009/0138138 A1 | 5/2009 | Ferren et al. | |
| 2009/0306840 A1 | 12/2009 | Blenkhorn et al. | |
| 2014/0236398 A1 | 8/2014 | Zhang | |
| 2014/0316616 A1* | 10/2014 | Kugelmass | G05D 1/104 |
| | | | 701/8 |
| 2014/0320607 A1* | 10/2014 | Hamann | H04N 23/69 |
| | | | 348/47 |
| 2015/0226575 A1* | 8/2015 | Rambo | G05D 1/0202 |
| | | | 701/523 |
| 2015/0323932 A1 | 11/2015 | Paduano et al. | |
| 2016/0001883 A1* | 1/2016 | Sanz | H02J 7/0042 |
| | | | 244/17.23 |
| 2016/0034607 A1* | 2/2016 | Maestas | G06F 17/16 |
| | | | 701/16 |
| 2016/0086497 A1* | 3/2016 | Williams | G08G 5/025 |
| | | | 701/16 |
| 2016/0093225 A1* | 3/2016 | Williams | G01C 21/20 |
| | | | 701/17 |
| 2016/0114905 A1 | 4/2016 | Derenick et al. | |
| 2016/0122038 A1* | 5/2016 | Fleischman | B64C 39/024 |
| | | | 244/114 R |
| 2017/0275023 A1* | 9/2017 | Harris | H04N 13/271 |
| 2017/0354887 A1 | 12/2017 | Bollermann et al. | |
| 2018/0350086 A1* | 12/2018 | Sweet, III | G01C 21/00 |
| 2019/0248487 A1 | 8/2019 | Holtz et al. | |
| 2020/0012296 A1 | 1/2020 | Gurdan et al. | |
| 2020/0122822 A1 | 4/2020 | Bosworth et al. | |
| 2020/0302627 A1 | 9/2020 | Duggal et al. | |
| 2021/0319707 A1* | 10/2021 | Brown | B64C 39/024 |
| 2021/0327283 A1* | 10/2021 | Reed | G06V 20/176 |

FOREIGN PATENT DOCUMENTS

| | | | | |
|---|---|---|---|---|
| CN | 101405566 A | | 4/2009 | |
| CN | 100567898 C | | 12/2009 | |
| CN | 102289230 A | * | 12/2011 | |
| CN | 103587708 A | | 2/2014 | |
| CN | 104049641 A | | 9/2014 | |
| CN | 104309803 A | | 1/2015 | |
| CN | 105043395 A | | 11/2015 | |
| CN | 105387860 A | | 3/2016 | |
| CN | 105556408 B | * | 2/2018 | ............. B64C 13/04 |
| CN | 108710383 A | | 10/2018 | |
| CN | 109562844 A | | 4/2019 | |
| EP | 2996009 A1 | | 3/2016 | |
| FR | 3024127 A1 | | 1/2016 | |
| FR | 3038991 A1 | | 1/2020 | |
| KR | 10-2013-0133480 | | 12/2013 | |
| KR | 10-1350242 | | 1/2014 | |
| WO | WO 2014/169353 A1 | | 10/2014 | |
| WO | WO 2016/109000 A2 | | 7/2016 | |
| WO | WO 2016/130721 A2 | | 8/2016 | |
| WO | WO 2016/146713 A1 | | 9/2016 | |
| WO | WO 2017/082128 A1 | | 5/2017 | |
| WO | WO-2017222542 A1 | * | 12/2017 | ............. B64C 39/024 |

OTHER PUBLICATIONS

International Search Report dated Feb. 28, 2017, by the State Intellectual Property Office of the P.R. China in counterpart PCT application PCT/CN2016/093767.

* cited by examiner

| 1/16 | 1/8 | 1/16 |
|------|-----|------|
| 1/8  | 1/4 | 1/8  |
| 1/16 | 1/8 | 1/16 |

*Fig. 7*

AUTOMATIC TERRAIN EVALUATION OF LANDING SURFACES, AND ASSOCIATED SYSTEMS AND METHODS

RELATED APPLICATIONS

This application is a continuation of U.S. patent application Ser. No. 16/264,239 (now allowed) filed on Jan. 31, 2019, which is a continuation application of International Application No. PCT/CN16/93767, filed on Aug. 6, 2016, the entire contents of all of which are hereby incorporated by reference.

TECHNICAL FIELD

The present technology is directed generally to devices that automatically measure or otherwise evaluate the terrain of a landing surface or other target surface, and associated systems and methods.

BACKGROUND

Unmanned aerial vehicles (UAVs) are aircraft that operate without human pilots aboard. UAVs may operate under remote control via off-board human controllers, or autonomously by onboard computers. Use of UAVs is rapidly expanding in military, commercial, scientific, recreational and other applications.

SUMMARY

The following summary is provided for the convenience of the reader and identifies several representative embodiments of the disclosed technology.

A computer-implemented method for automatically identifying characteristics of a landing surface in accordance with a representative embodiment includes receiving a request to land a movable object; in response to the request, identifying a target landing area on a landing surface based on at least one image of the landing surface obtained by the movable object; and directing the movable object to land at the target landing area. In particular embodiments, the method can include retrieving depth information corresponding to individual pixels of the at least one image of the landing surface, wherein the individual pixels correspond to portions of the landing surface. In any of the foregoing embodiments, the method can include generating a depth map including the depth information of the individual pixels, which can represent the heights of the corresponding portions of the landing surface. In any of the foregoing embodiments, the at least one image can include at least two images, and the method can include performing a stereo matching on the at least two images of the landing surface to generate depth information of matching pixels of the at least two images.

In any of the foregoing embodiments, the method can include identifying a plurality of candidate areas within a pixel frame of the at least one image of the landing surface. The method can further include, for an individual candidate area, identifying a best fit plane for pixels within the candidate area and determining a cost value associated with the best fit plane based on a cost function. The method can still further include selecting at least one of the candidate areas as corresponding to the target landing area, based on the cost values. In any of the foregoing embodiments, the cost value associated with the best fit plane can denote a degree of deviation of pixels from the best fit plane. In any of the foregoing embodiments, the cost function can be based on a sum of squares of deviations of pixels from the best fit plane. In any of the foregoing embodiments, the method can include determining whether the best fit planes are tilted by comparing normal vectors of the best fit planes with a gravity vector, and discarding candidate areas with best fit planes that are tilted. In any of the foregoing embodiments, the method can include discarding candidate areas with cost functions that are larger than a threshold value. In any of the foregoing embodiments, the method can include (if all candidate areas are discarded because the cost functions are larger than the threshold value) directing the movable object to travel to another location, and capturing images of another landing surface at the other location.

In any of the foregoing embodiments, the method can include adjusting the cost functions to include cost function information for nearby candidate areas. In any of the foregoing embodiments, the process of adjusting the cost function can include applying a smoothing function to adjust the cost functions of the individual candidate areas. In any of the foregoing embodiments, the smoothing function can be a Gaussian blur function. In any of the foregoing embodiments, the process of selecting can include selecting the candidate area with the lowest cost function of the individual candidate areas. In any of the foregoing embodiments, the process of determining a plurality of candidate areas can include scanning the pixel frame with a sliding window to generate the plurality of candidate areas, wherein a size of the sliding window is equal to or larger than a size of the movable object. In any of the foregoing embodiments, a shape of an individual candidate area can conform to a shape of the movable object.

In other embodiments, a representative apparatus includes at least one motor, and a controller programmed with instructions. The instructions, when executed, receive a request to land the apparatus, and, in response to the request, identify a target landing area on a landing surface based on at least one image of the landing surface obtained by the apparatus. The instructions can further direct the apparatus to land at the target landing area using the at least one motor. In particular embodiments, the apparatus can be an unmanned aerial vehicle (UAV), a manned aircraft, an autonomous car, a self-balancing vehicle, or a robot. In any of the foregoing embodiments, the instructions, when executed, can capture new images of the landing surface as the apparatus descends toward the target landing area, and can update a depth map to include depth information of individual pixels of the new images of the landing surface, wherein the individual pixels correspond to portions of the landing surface. The instructions can determine, based on the depth map, whether the target landing area continues to satisfy a landing condition as the apparatus descends.

In still further embodiments, an unmanned aerial vehicle (UAV) apparatus includes a plurality of motors, a plurality of propellers, with individual propellers carried by corresponding individual motors, at least one camera, and a controller. The controller can be programmed with instructions that, when executed, identify a target landing area on a landing surface based on at least one image of the landing surface captured by the at least one camera, and direct the UAV apparatus to land using the motors at the target landing area. In particular embodiments, the at least one camera can include two bottom-viewing cameras, and the instructions, when executed, can simultaneously capture two images of the landing surface using the two bottom-viewing cameras. In any of the foregoing embodiments, the instructions, when executed, can capture two images of the landing surface using the at least one camera at two different time points, wherein the two images of the landing surface are captured from different perspectives. In any of the foregoing embodiments, the instructions, when executed, can direct the UAV apparatus to a predetermined height suitable for automatic terrain measurement. In any of the foregoing embodiments, the instructions, when executed, can determine whether the at least one image of the landing surface is captured when the UAV apparatus is directly above a center of the landing surface, and if the at least one image of the landing surface is captured when the UAV apparatus is not directly above a center of the landing surface, apply a perspective projection to the at least one image of the landing surface. In any of the foregoing embodiments, the instructions, when executed, can direct the movable object to move to a location directly above the target landing area.

In yet still further embodiments, a non-transitory machine readable medium has stored thereon instructions that, when executed, receive a request to land the movable objects, and in response to the request, identify a target landing area on a landing surface based on at least one image of the landing surface obtained by the movable object. The instructions can direct the movable object to land at the target landing area. In particular embodiments, the instructions, when executed, can monitor an elevation of the movable object when the movable object descends toward the target landing area, and, if the elevation of the movable object is disruptively changing, stabilize a flight attitude of the movable object before continuing to descend. In any of the foregoing embodiments, the instructions, when executed, can detect a disruptive change of the status of an inertial navigation system or a front-viewing camera of the movable object, and pause the descent of the movable object until the elevation of the movable object is no longer disruptively changing. In any of the foregoing embodiments, the instructions, when executed, can monitor an elevation of the movable object when the movable object descends toward the target landing area, and, if the elevation of the movable object is disruptively changing, determine that the target landing area is currently not suitable for landing. The moveable object can then be directed to hover at a current altitude. In any of the foregoing embodiments, the instructions, when executed, can direct the movable object to ascend to a higher altitude if the elevation of the movable object continues to be disruptively changing for a time period.

BRIEF DESCRIPTION OF THE DRAWINGS

FIG. 7 is a partially schematic illustration of a sample Gaussian blur filter for candidate areas, in accordance with a representative embodiment of the present technology.

DETAILED DESCRIPTION

1. Overview

Figure 1:
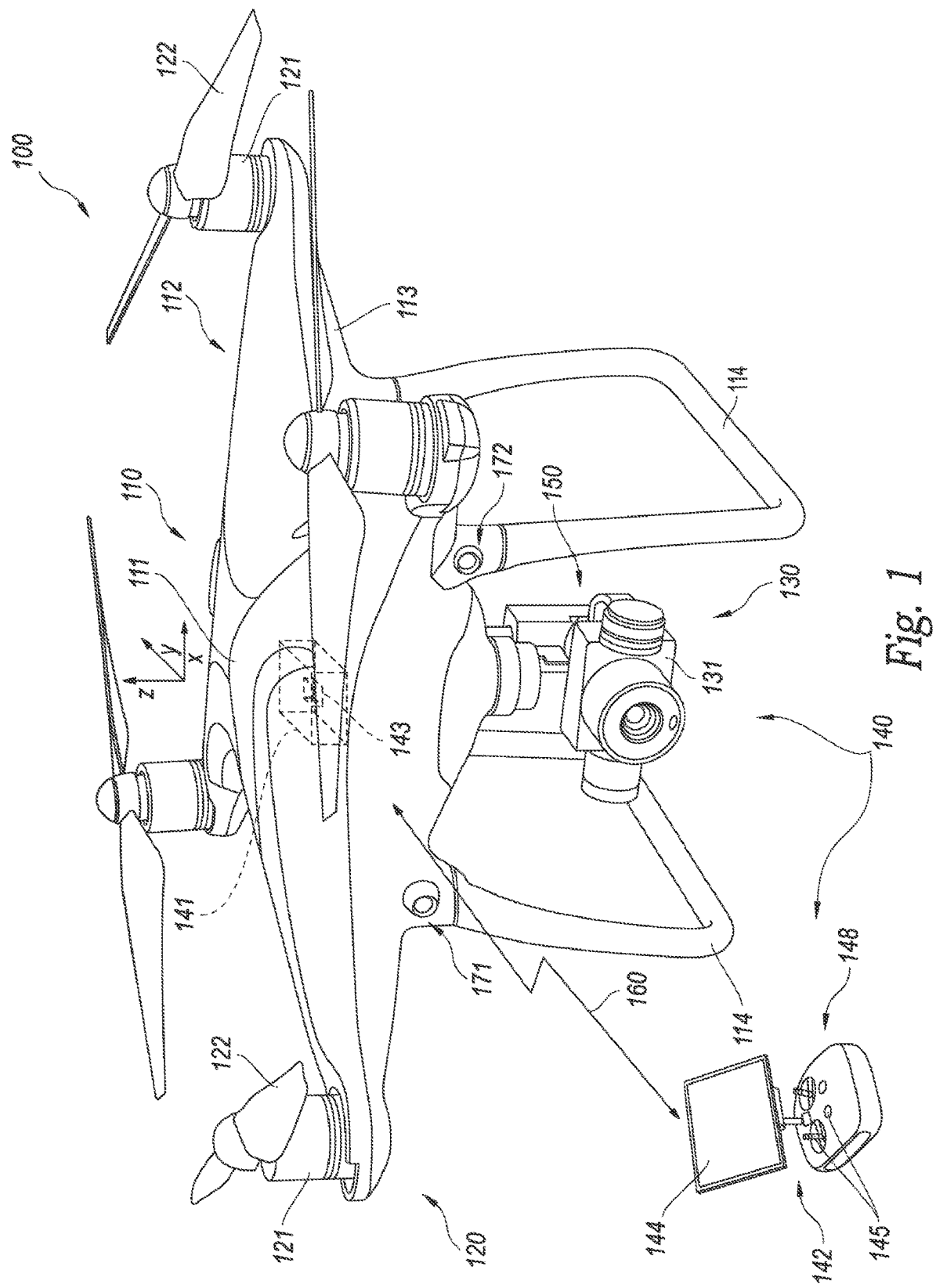
FIG. 1 is a partially schematic, isometric illustration of a UAV having a control system configured to automatically evaluate a landing surface, in accordance with a representative embodiment of the present technology.

Landing of UAVs is challenging. For example, a human operator can remotely control the landing process of a UAV. The human operator controls the UAV to maneuver to a target location, e.g., in proximity to the human operator. The UAV captures a live-view video stream of the ground and transmits the live-view video stream in a real time to a device viewed by the human operator. Based on the live-view of the ground, the human operator identifies a suitable landing spot (also referred to as target landing area) and manually controls the UAV to land on the landing spot.

However, such a landing process requires that the human operator be highly skilled in controlling the UAV. It is challenging to control the UAV landing process based on the live-view video feed from the UAV, particularly when the human operator does not have a direct visual perception of the UAV's flight trajectory and attitude. Thus, the UAV may be damaged during a rough landing caused by human error during the landing process.

The present technology is directed generally to devices that automatically measure or otherwise evaluate the terrain of a landing surface or other target surface, and associated systems and methods. Such devices can include, e.g., UAVs, manned aircraft, autonomous cars, self-balancing vehicles, robots, etc. In particular embodiments, a UAV can automatically evaluate a landing surface based on computer visualization technologies. During a landing process, the UAV captures visual signals (e.g., images or videos) of the landing surface. Based on the visual signals, the UAV detects characteristics of the terrain of the landing surface and identifies a spot or area with a flat or smooth surface suitable for landing. The UAV then descends onto the landing spot for an improved landing process.

The implementation of the technology can include on-board visual sensors such as cameras to evaluate the landing surface, e.g., based on stereo matching techniques. In particular embodiments, depth information is extracted from the images and used to reconstruct the 3D terrain and select the target landing spot. Compared to conventional UAV landing processes, an advantage of this automatic landing surface measurement technology is that the UAV (or other types of movable objects) can automatically and efficiently identify a target landing spot without intervention by a human operator. This in turn can allow the UAV to descend to the landing spot without damaging itself due to an uneven or tilted landing surface.

Several details describing structures or processes that are well-known and often associated with UAVs (or other types of movable objects) and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations or different components than those described in this section. Accordingly, the technology may have other embodiments with additional elements and/or without several of the elements described below with reference to FIGS. 1-9.

FIGS. 1-9 are provided to illustrate representative embodiments of the disclosed technology. Unless provided for otherwise, the drawings are not intended to limit the scope of the claims in the present application.

Many embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers and the like). Information handled by these computers and controllers can be presented at any suitable display medium, including a CRT (cathode ray tube) display or LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium.

2. Representative Embodiments

FIG. 1 is a partially schematic, isometric illustration of a representative UAV 100 configured in accordance with embodiments of the present technology. The UAV 100 can include an airframe 110 that can in turn include a central portion 111 and one or more outer portions 112. In a representative embodiment shown in FIG. 1, the airframe 110 includes four outer portions 112 (e.g., arms 113) that are spaced apart from each other as they extend away from the central portion 111. In other embodiments, the airframe 110 can include other numbers of outer portions 112. In any of these embodiments, individual outer portions 112 can support components of a propulsion system 120 that drives the UAV 100. For example, individual arms 113 can support corresponding individual motors 121 that drive corresponding propellers 122. The UAV can control each individual set of a motor 121 and a corresponding propeller 122, independent of the remaining motors 121 and propellers 122.

The airframe 110 can carry a payload 130, for example, an imaging device 131. In particular embodiments, the imaging device 131 can include a camera, for example, a camera configured to capture video data, still data, or both. The camera can be sensitive to wavelengths in any of a variety of suitable wavelength bands, including visual, ultraviolet, infrared or combinations thereof. In still further embodiments, the payload 130 can include other types of sensors, other types of cargo (e.g., packages or other deliverables), or both. In many of these embodiments, the payload 130 is supported relative to the airframe 110 with a gimbal 150 that allows the payload 130 to be independently positioned relative to the airframe 110. Accordingly, for example when the payload 130 includes the imaging device 131, the imaging device 131 can be moved relative to the airframe 110 to track a target. When the UAV 100 is not in flight, landing gear 114 can support the UAV 100 in a position that protects the payload 130, as shown in FIG. 1.

In a representative embodiment, the UAV 100 includes a control system 140 having some components carried on board the UAV 100 and some components positioned off the UAV 100. For example, the control system 140 can include a first controller 141 carried by the UAV 100, and a second controller 142 (e.g., a human-operated, ground-based controller) positioned remote from the UAV 100 and connected to the first controller 141 via a communication link 160 (e.g., a wireless link). The first controller 141 can include an on-board computer-readable medium 143a that executes instructions directing the actions of the UAV 100, including, but not limited to, operation of the propulsion system 120 and the imaging device 131. The second controller 142 can include an off-board computer-readable medium 143b, and one or more input/output devices 148, e.g., a display 144 and control devices 145. The operator manipulates the control devices 145 to control the UAV 100 remotely, and receives feedback from the UAV 100 via the display 144 and/or other devices. In other representative embodiments, the UAV 100 can operate autonomously, in which case the second controller 142 can be eliminated, or can be used solely for operator override functions. The on-board computer-readable medium 143a can be removable from the UAV 100. The off-board computer-readable medium 143b can be removable from the second controller 142, e.g., separable from the one or more input/output devices 148.

Figure 2:
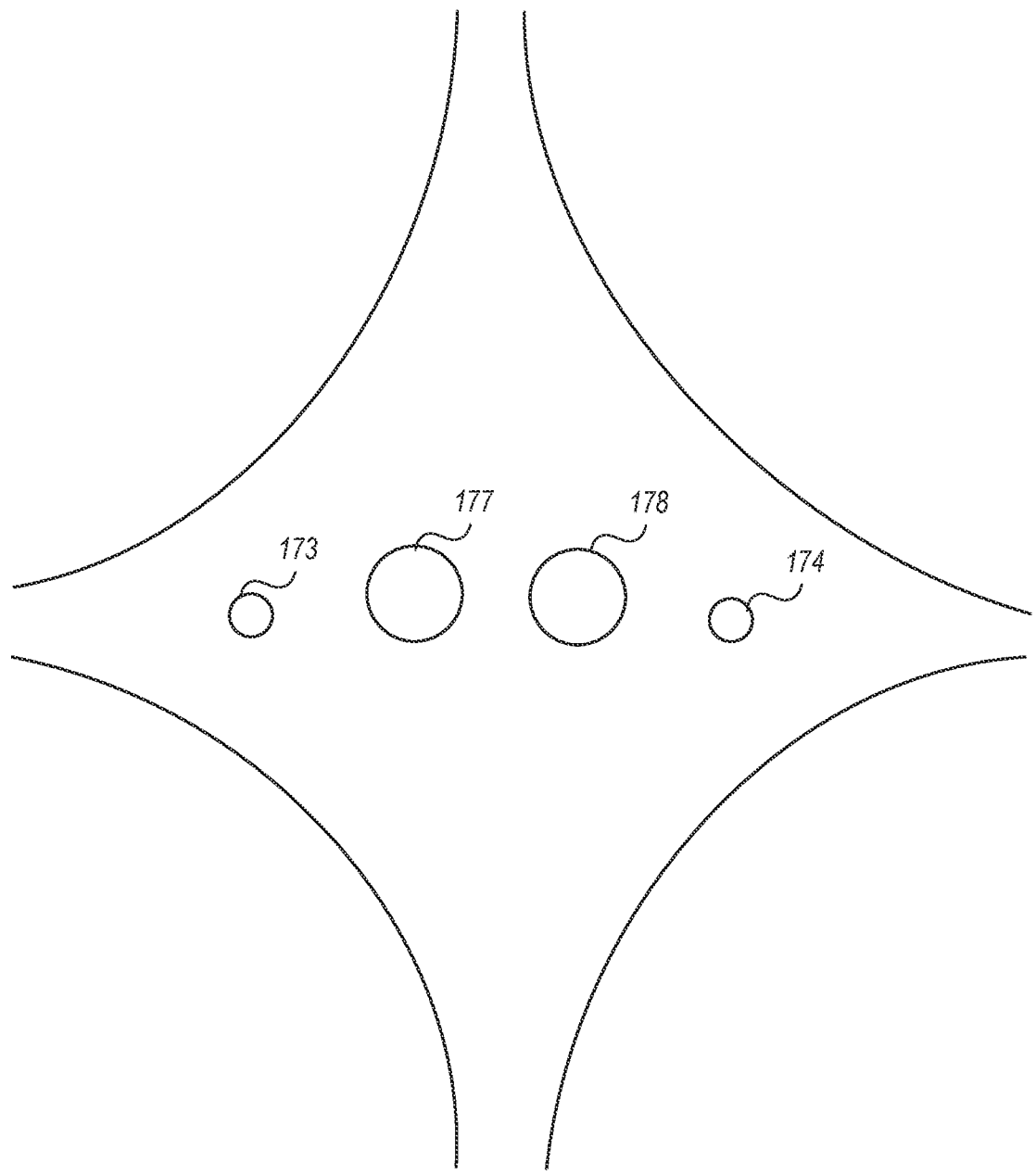
FIG. 2 is a partially schematic illustration of a portion of the bottom of a UAV configured in accordance with embodiments of the present technology.

In a representative embodiment illustrated in FIG. 1, the UAV 100 includes two front-viewing cameras 171 and 172. The cameras 171 and 172 capture images or videos at a human-visible spectrum range, an infrared range, an ultraviolet range, or a combination thereof. The UAV 100 can include more sensors, e.g., at the bottom. FIG. 2 is a partially schematic illustration of a portion of the bottom of a representative UAV 100 configured in accordance with embodiments of the present technology. At the bottom of the airframe 110, the UAV can further include two bottom-viewing cameras 173 and 174. In addition, the UAV can include two ultrasonic sensors 177 and 178. The ultrasonic sensors 177 and 178 can detect objects or land surfaces below the UAV 100 and measure the distance to the objects or land surfaces by transmitting and receiving ultrasonic waves. Although the UAV illustrated in FIGS. 1 and 2 includes four cameras 171-174 and two ultrasonic sensors 177-178, UAVs in other embodiments can include any suitable number of cameras or ultrasonic sensors. In still further embodiments, the UAV 100 can include other types of sensors.

Figure 3:
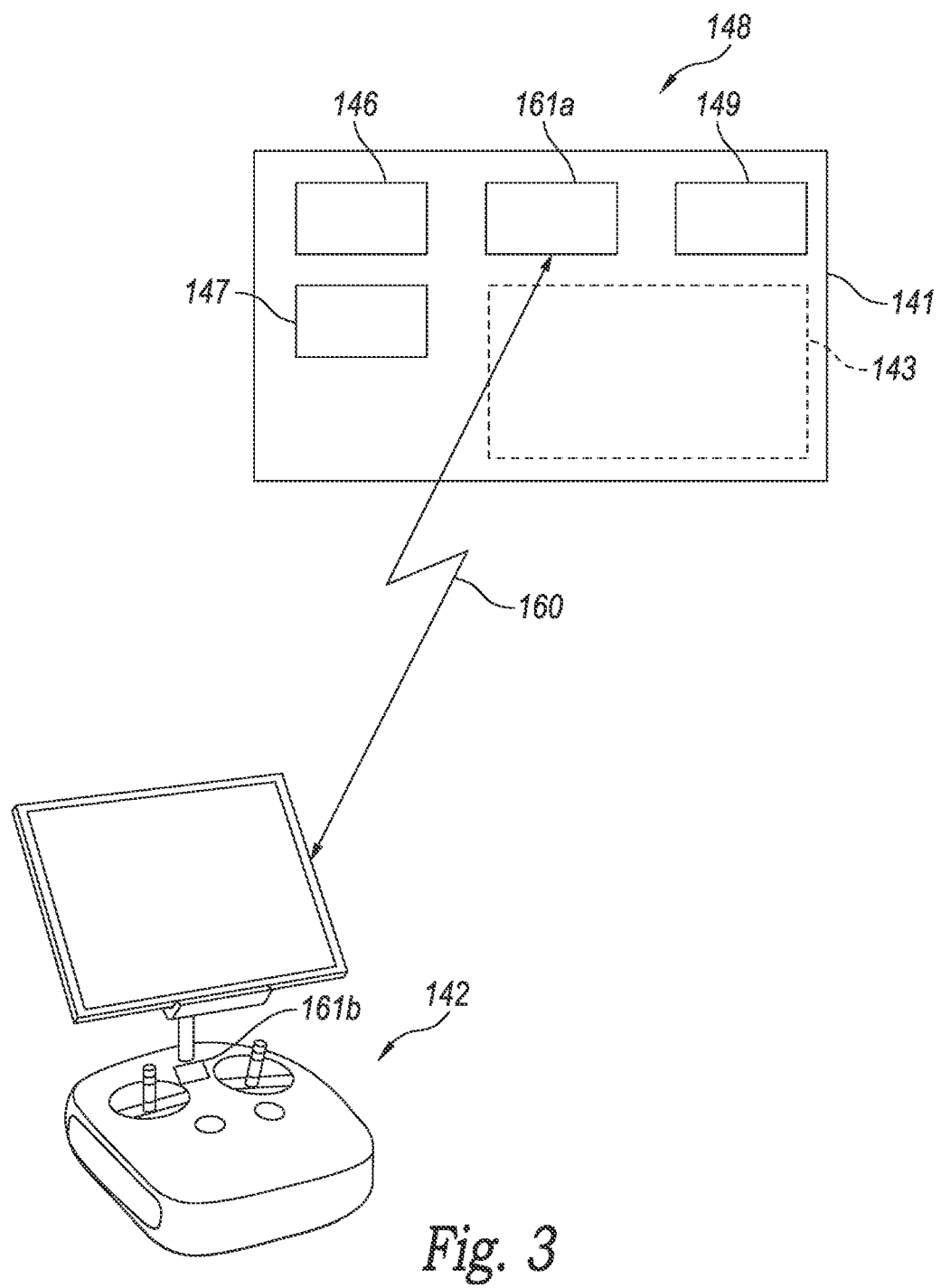
FIG. 3 is a partially schematic illustration of a control system including a first controller carried on board a UAV and configured to control the UAV in accordance with representative embodiments of the present technology.

FIG. 3 is a schematic illustration of the first controller 141, which can include a processor 146, memory 147, and input/output devices 148. A control unit 149 (also referred to as controller) directs the operation of the various components of the UAV 100, including the propulsion system 120 described above. A computer-readable medium 143 (which can be housed in, or include elements of, any of the foregoing components) contains instructions that, when executed, direct the behavior of the propulsion system 120 and other UAV systems. A first communication device 161a is configured to provide wireless communication with a corresponding second communication device 161b carried by the second controller 142, via the communication link 160.

Using the bottom-viewing cameras 173-174 or the ultrasonic sensors 177-178, the UAV 100 is able to determine its flight height in relation to a ground level (e.g., a local round level), as well as evaluate the terrain of one or more candidate landing surfaces. Based on the evaluation, the UAV identifies a landing spot that is suitable (e.g., generally flat) for landing within the candidate landing surface.

Figure 4A:
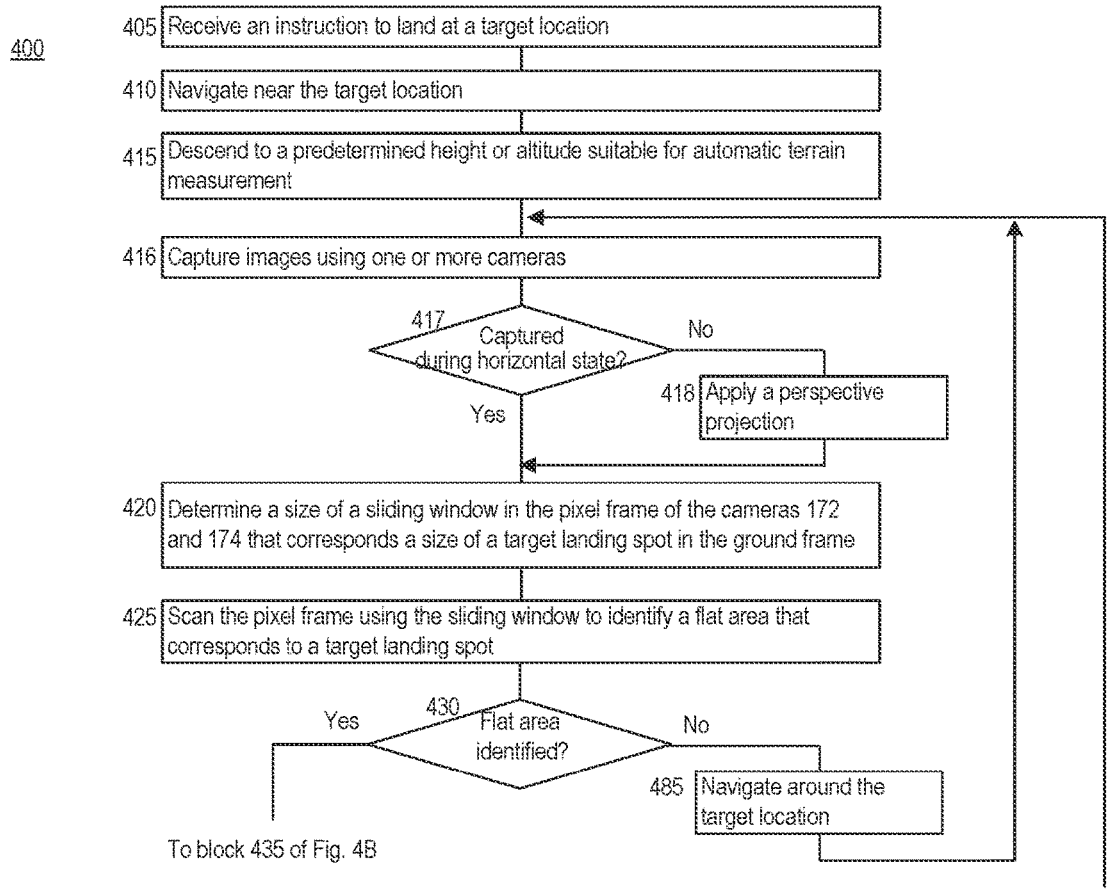
FIG. 4A is a flow diagram illustrating a planning stage of a process for landing a movable object in accordance with representative embodiments of the present technology.
Figure 4B:
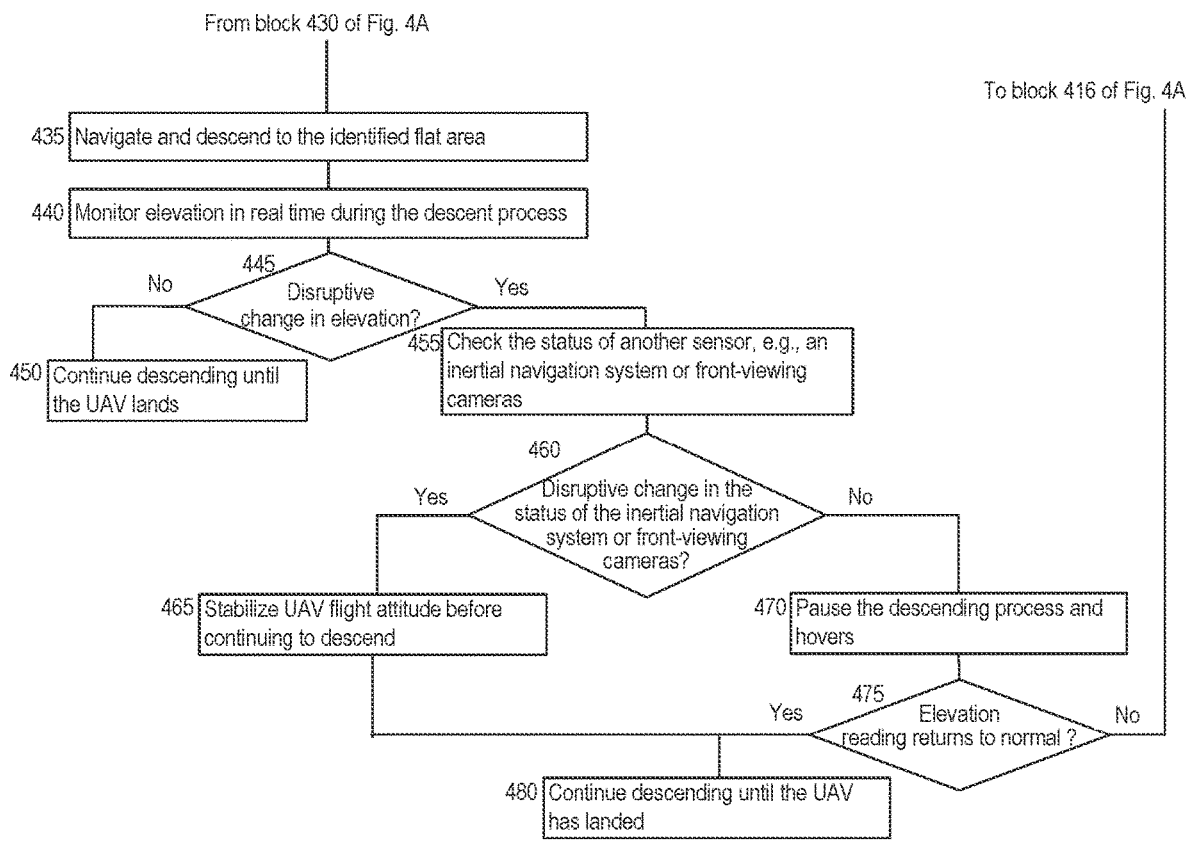
FIG. 4B is a flow diagram illustrating a descending stage of a process for landing a movable object in accordance with representative embodiments of the present technology.

FIGS. 4A and 4B are flow diagrams illustrating a process 400 for landing a movable object in accordance with representative embodiments of the present technology. FIG. 4A illustrates a planning stage of the process 400, and FIG. 4B illustrates a descending stage of the process 400. The process 400 can be executed by a movable object of various types, such as UAVs, manned aircraft, autonomous cars, self-balancing vehicles, or robots.

Turning to FIG. 4A, at block 405 of process 400, the movable object (e.g., a UAV) receives an instruction to land at a target location. At block 410, the movable object navigates near the target location. The receiving of the instruction can be triggered by various mechanisms. In some embodiments, for example, a human operator presses a "Go Home" button of the second controller 142 or a "Go Home" button on the display 144 of the second controller 142 (as illustrated in FIG. 3). The second controller 142 generates and transmits the instruction to the UAV in flight. The instruction being transmitted can include the coordinates of the target location. For example, the second controller 142 can include the coordinates of the location of the second controller 142 itself as the target location. Alternatively, the second controller 142 can include in the instruction a predetermined home location that is recorded in a memory of the second controller 142.

In some embodiments, the instruction does not necessarily include the coordinates of the target location. For example, when the UAV starts operating and takes off, the UAV can detect and record the coordinates of the takeoff location. Once the UAV receives the instruction, the UAV can use the coordinates of the takeoff location as the recorded target location for navigation.

In some embodiments, the UAV itself can generate the instruction when the battery level of the UAV is below a threshold level. The UAV generates the instruction for landing so that the UAV can avoid losing power and crashing by returning to a landing spot before the battery is depleted.

At block 415, the movable object descends to a predetermined height suitable for automatic terrain evaluation or measurement. The height (also referred to as elevation) is calculated in relation to an object (e.g., a building, a boat, or a platform) or ground below the UAV. In some embodiments, the predetermined height is decided based on the pixel resolution of the bottom-viewing cameras 173 and 174 (as illustrated in FIG. 2). A three-dimensional (3D) reconstruction of the terrain can be based on images captured by the bottom-viewing cameras 173 and 174. An individual pixel of the images represents a land area. The higher the UAV hovers, the larger the land area that is represented by the individual pixel, and therefore the lower the resolution the 3D terrain reconstruction. The predetermined height is generally small enough such that the resolution of the 3D terrain reconstruction is high enough to identify a suitable landing spot for the UAV.

On the other hand, the predetermined height is large enough such that the field of view of the bottom-viewing cameras 173 and 174 covers a suitable large area of the land. If the predetermined height is too small, the cameras 173-174 can only cover a small land area, which may not include any suitable landing spots. In some embodiments, the predetermined height is about 3 meters.

The UAV can use various types of depth sensors to determine the current flight height. For example, the depth sensors for determining flight height can include a single camera, a pair of cameras, an ultrasonic sensor, an IMU, or a laser rangefinder. In some embodiments, the UAV can use the bottom-viewing cameras 173 and 174 (as illustrated in FIG. 2) to determine the flight height. As illustrated in FIG. 2, the bottom-viewing cameras 173 and 174 are disposed on the bottom of the UAV 100 and are separated by a known distance. In other words, the bottom-viewing cameras 173 and 174 capture images or videos of the object or ground from different perspectives. The UAV 100 can use stereo matching techniques (e.g., semi-global block matching) to find corresponding pixels in the images or video frames captured by cameras 172 and 174, and conduct a 3D reconstruction process by triangulation. In other embodiments, the cameras 172 and 174 can be replaced by one or more external cameras (e.g., the imaging device 131 illustrated in FIG. 1).

In still another embodiment, the UAV can use a single bottom-viewing camera to capture images or videos of the objector ground from different perspectives. For example, the camera of the UAV captures a first image of the ground from a first perspective. Then the UVA moves to a different location, and the camera captures a second image of the ground from a second perspective. The UAV can then use stereo matching techniques to find corresponding pixels in those two images and conduct 3D reconstruction by triangulation.

In yet another embodiment, the UAV can use one or more ultrasonic sensors (e.g., ultrasonic sensors 177 and 178 as illustrated in FIG. 2) to determine the flight height. An ultrasonic sensor of the UAV emits an ultrasonic wave downward to the object or ground. The emitted ultrasonic wave is reflected by the object or ground. The ultrasonic sensor receives the reflected ultrasonic wave and determines the height based on the travelling time of the ultrasonic wave.

Furthermore, the UAV 100 can use an on-board inertial measurement unit (IMU) to determine the flight height. The IMU can include, e.g., one or more accelerometers, gyroscopes, magnetometers, or a combination thereof. The IMU provides acceleration information, which can be used to calculate velocity and position information by integral operations.

In some embodiments, the UAV 100 can use a combination of multiple components, such as the ultrasonic sensors 177 and 178, the bottom-viewing cameras 173 and 174 and the IMU, to determine the flight height. In some other embodiments, the UAV 100 dynamically switches between components, such as the ultrasonic sensors 177 and 178, the bottom-viewing cameras 173 and 174 and the IMU, to determine the flight height.

At block 416, the movable object captures images using one or more cameras (e.g., the cameras 172 and 174 of the UAV 100 as illustrated in FIG. 1). At decision block 417, the movable object determines whether the images are captured when the UAV is at a horizontal state. In other words, the movable object determines whether the images are captured for the landing surface directly below the UAV. If not, at block 418, the movable object applies a perspective projection, which is described later with reference to FIG. 8. Otherwise, the process proceeds directly to block 420.

Figure 5:
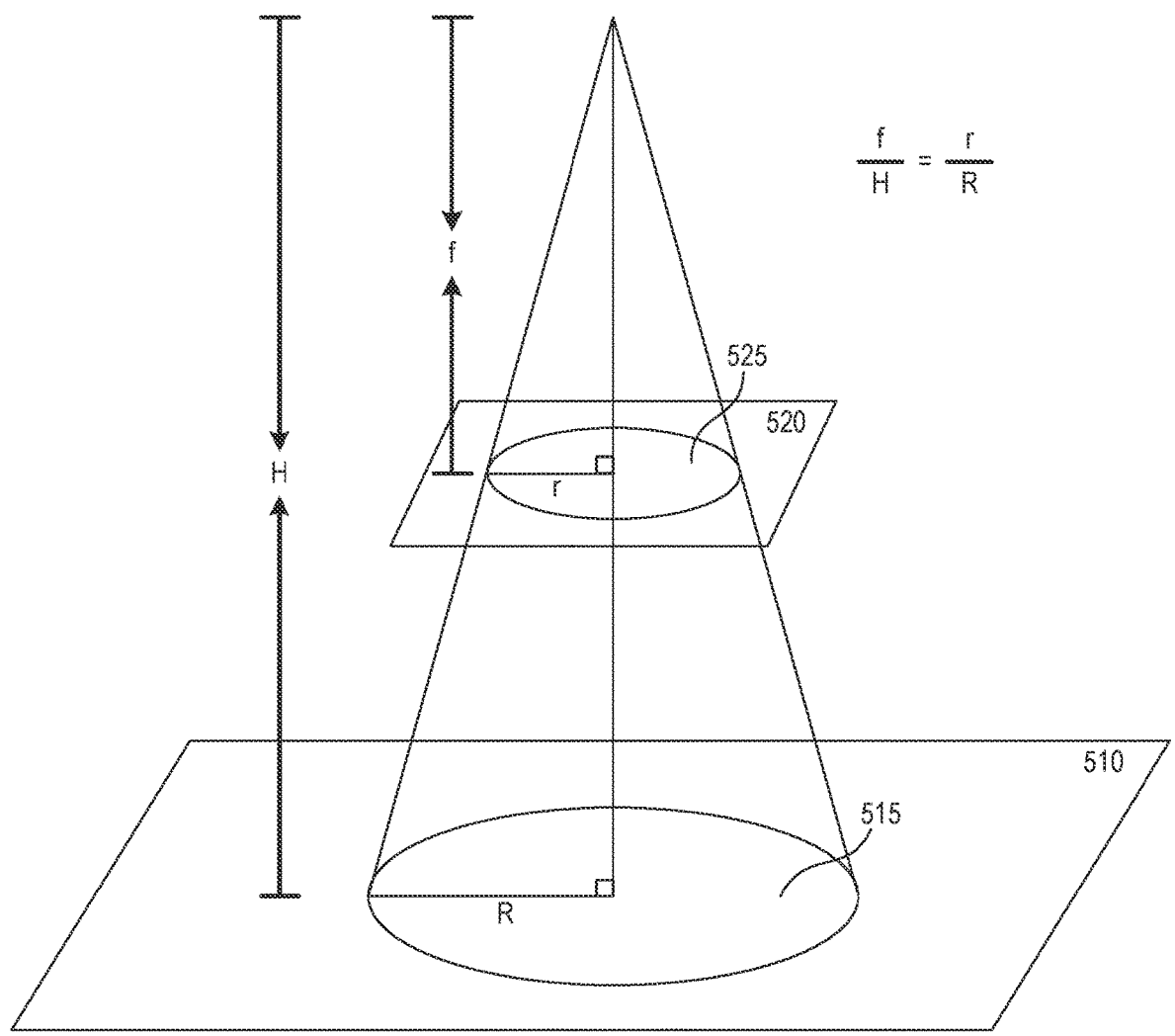
FIG. 5 is a partially schematic illustration of a sliding window and a corresponding candidate landing spot in accordance with a representative embodiment of the present technology.

At block 420, the movable object determines a size of a sliding window in the pixel frame of the cameras 172 and 174 that corresponds a size of a target landing spot in the ground frame. FIG. 5 is a partially schematic illustration of a sliding window and a corresponding suitable target landing spot, in accordance with a representative embodiment of the present technology. A target landing spot 515 is located in a ground frame 510. The target landing spot 515 has a radius R. A representative circular sliding window 525 is located in a pixel frame 520. The sliding window 525 has a radius r. Although FIG. 5 show the target landing spot 515 and the sliding window 525 having circular shapes, the target landing spot 515 and the sliding window 525 can have other suitable shapes, such as squares, rectangles, etc.

The pixel frame 520 represents an area of pixels in the bottom-viewing cameras 173 and 174 that captures images or videos of the ground frame 510 on the ground. In other words, an individual pixel of the pixel frame 520 contains visual information of a corresponding area within the ground frame 510 on the ground. The target landing spot 515 in the ground frame 510 has a size that is large enough for the UAV to land. Thus, the size of the target landing spot 515 can depend on the size (e.g., the "footprint" or planform size) of the UAV. The planform is the contour of the UAV (or other types of movable objects) or mass as viewed from above. In some embodiments, the target landing spot 515 has a size that equals the size of the UAV. Similarly, the shape of the target landing spot 515 can also relate to the shape of the UAV. In some embodiments, for example, the shape of the target landing spot 515 can generally conform to the shape (e.g., the planform shape) of the UAV.

The sliding window 525 represents an area in the pixel frame 520 that captures the image of the target landing spot 515. As shown in FIG. 5, the radius r of the sliding window 525 depends on the size of the UAV, the current height, and the focal lengths of the cameras 172 and 174: $r=f*R/H$, where R is the radius of the target landing spot, f is the focal length, and H is the focal length plus the current flight height measured between the camera and the land surface.

Turning back to FIG. 4A, at block 425, the movable object scans the pixel frame using the sliding window to identify a flat area that corresponds to a target landing spot. The details of the process carried out in block 425 are described later with reference to FIG. 6.

Then at decision block 430, the movable object determines whether a flat area is identified. If the UAV identifies no flat area within the pixel frame at decision block 430, block 485 includes navigating around the target location. The process 400 further goes back to block 416 to capture images of another area for identifying potential landing spots.

If the UAV identifies a flat area that corresponds to a target landing spot, then the process 400 proceeds to the descending stage, which is illustrated in FIG. 4B. Turning to FIG. 4B, at block 435, the movable object navigates and descends to the identified flat area as the target landing spot. Furthermore, at block 440, the movable object monitors elevation in real time during the descent process. At decision block 445, the movable object determines whether there is a disruptive change in flight elevation. The disruptive change in flight elevation can be detected by the bottom-viewing cameras 173 and 174, the IMU, or a combination thereof. Since the UAV descends gradually, such a disruptive change may suggest a change of the environment, particularly a change of the landing surface. For example, an obstruction may have moved onto the landing surface.

In some embodiments, the movable object determines that a change is disruptive if the change in flight elevation is more than a predicted change in flight elevation based on the current descending speed of the moveable object (e.g., clue to a downdraft). In some other embodiments, the movable object determines that a change is disruptive if the change in flight elevation is faster than a maximum descending speed at which the moveable object is designed to operate.

If there is no disruptive change in flight elevation, at block 450, the movable object continues descending until the UAV lands. If there is a disruptive change in flight elevation, at block 455, the movable object checks the status of another sensor, for example, an inertial navigation system or front-viewing cameras (e.g., front-viewing cameras 171 and 172 illustrated in FIG. 1) of the UAV. Decision block 460 includes determining if there is a further disruptive change in the status of the inertial navigation system or front-viewing cameras. If there is a further disruptive change in the status of the inertial navigation system or front-viewing cameras, this generally indicates that the flight altitude of the UAV is unstable. Thus, at block 465, the movable object stabilizes UAV flight altitude before continuing to descend.

If there is a no disruptive change in the status of the inertial navigation system or front-viewing cameras, this generally indicates that the UAV itself is descending in a stable matter. Instead, the disruptive change in flight elevation is caused by an environment change (e.g., a person or an object is now on the landing spot). At block 470, the movable object pauses the descending process and hovers. At decision block 475, the machine determines whether the flight elevation reading returns to a normal level within a certain (e.g., pre-selected) time period. If so, at block 480, the movable object continues descending until the UAV lands. Otherwise, the process 400 goes back to block 416 of the planning stage (illustrated in FIG. 4A) to repeat the process of identifying another target landing spot.

In some embodiments, a controller (e.g., the first controller 141 as illustrated in FIGS. 1 and 3) can be programmed with instructions, when executed, conduct one or more steps as illustrated in FIGS. 4A and 4B. For example, an apparatus can include a structure and one or more motors carried by the structure. The structure can include, e.g., at least a portion of a UAV, a manned aircraft, an autonomous car, a self-balancing vehicle, or a robot. The apparatus can further include such a controller programmed to conduct one or more steps of the process 400.

Figure 6:
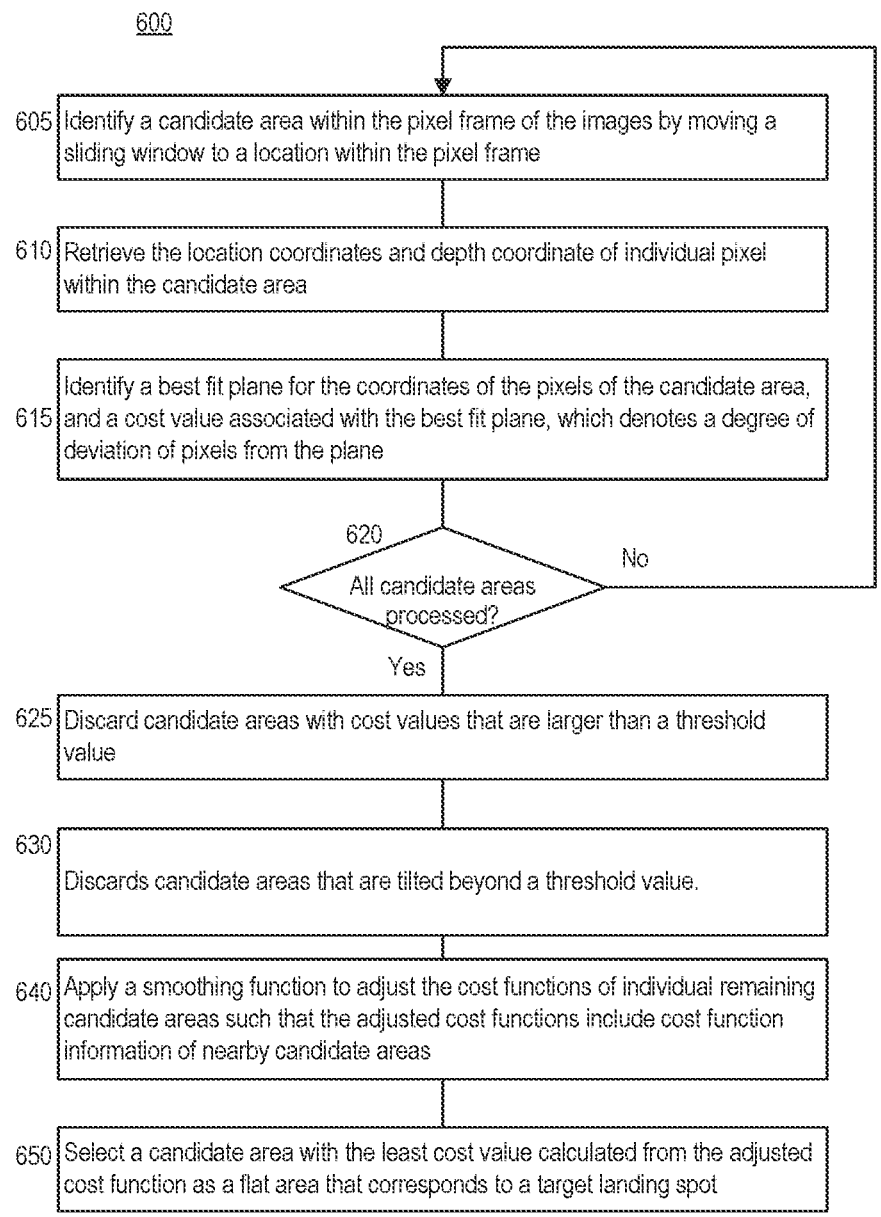
FIG. 6 is a flow diagram illustrating a process for identifying a flat area in a pixel frame that corresponds to a target landing spot, in accordance with a representative embodiment of the present technology.

FIG. 6 is a flow diagram illustrating a process 600 for identifying a flat area in a pixel frame that corresponds to a target landing spot, in accordance with a representative embodiment of the present technology. At block 605, the movable object (e.g., UAV) identifies a candidate area within the pixel frame of the images by moving a sliding window to a location within the pixel frame. The size of the sliding window is determined, e.g., based on the technology described above with reference to FIG. 5. The individual candidate area occupies a unique portion of the pixel frame. The candidate areas can, but need not necessarily, overlap with each other. In some embodiments, the technology can determine a step size (measured by, e.g., pixels) for moving the sliding window. For example, once a candidate area is identified, the next candidate area can be determined by moving the sliding window from the current candidate area by the determined step size.

At block 610, the movable object retrieves the location coordinates and depth coordinate of an individual pixel within the candidate area. For example, an individual pixel can have three coordinates. The x and y coordinates denote the location of the pixel within the pixel frame. The z coordinate denotes the depth information of the portion of the landing surface represented by the pixel. Thus, the x, y, z coordinates of the pixels recreate the terrain of a landing area represented by the candidate area. In some embodiments, the depth information can be retrieved using stereo matching techniques (e.g., semi-global block matching) based on images simultaneously captured by two cameras (e.g., cameras 172 and 174 as illustrated in FIG. 1) or two sequential images captured by a single camera. In other embodiments, the depth information can be retrieved using another distance sensor such as an ultrasonic sensor.

At block 615, the movable object identifies a "best fit" plane fit to the coordinates of the pixels of the candidate area, and a cost function associated with the best fit plane, which denotes a degree of deviation of pixels from the plane. The best fit plane is a plane with the minimized cost values among the possible fit planes. In other words, the degree of deviation suggests whether the pixels of the candidate area can be treated as a flat plane. If the degree of deviation is small, the actual landing surface represented by the candidate area is considered to be flat and suitable for a proper landing.

In some embodiments, the movable object can use an algorithm, e.g., Leverberg-Marquardt algorithm, to find the best fit plane and its associated cost value. The algorithm minimizes a sum of squares of deviations of pixels $Y_i$ from the fit plane function f.

$$S(\beta) = \sum_{i=1}^{n} [Y_i - f(P_{w,i}, \beta)]^2.$$

The fit plane function can be expressed as:

$$f(P_{w,i}, \beta) = \frac{|ax + by + cz + d|}{\sqrt{a^2 + b^2 + c^2}} + \varepsilon|a^2 + b^2 + c^2 + d^2 + 1|.$$

The residual vector r is:

$$r = Y_i - f(P_{w,i}, \beta) = -\frac{|ax + by + cz + d|}{\sqrt{a^2 + b^2 + c^2}} + \varepsilon|a^2 + b^2 + c^2 + d^2 + 1|.$$

The cost function for calculating the cost value is:

$$\min C = \sum_{i=1}^{n} r^2.$$

The residual can be further damped, e.g., according to the following algorithm:

$$(J^T J + \lambda I)\delta = J^T r.$$

where J is the Jacobian matrix of derivatives of the residuals with respect to the parameters, λ is a damping parameter (adaptive balance between the 2 steps), and r is the residual vector.

The dampening process first initializes values for damping parameter, and evaluates the residuals r and the Jacobian J at the initial parameter guess. Then the dampening process calculates the metric, $g=J^T J+\lambda I$, and the cost gradient, $\nabla C=J^T r$, $C=\frac{1}{2} r^2$.

Then the dampening process evaluates the new residuals $r_{new}$ at the point given by $x_{new}=x-g^{-1}\nabla C$, and calculates the cost at the new point $C_{new}=\frac{1}{2}r_{new}^2$. If $C_{new}<C$, the process accepts the step, $x=x_{new}$, and set $r=r_{new}$ and $\lambda=\lambda/\lambda_{down}$. Otherwise, the process rejects the step, and keeps the old parameter guess x and the old residuals r, and adjusts $\lambda=\lambda/\lambda_{up}$. The dampening process checks for convergence. If there is a convergence, the process returns x as the best-fit parameter. If there is no convergence yet but the step is accepted, the process evaluates the Jacobian J at the new parameter values and goes back to calculate the metric g and the cost gradient.

At decision block 620, the movable object determines whether all candidate areas within the pixel frame have been processed. If not, the process 600 goes back to block 605 to identify another candidate area within the pixel frame. If all candidate areas within the pixel frame have been processed, at block 625, the movable object discards candidate areas with cost values that are larger than a threshold value. The discarded areas are considered not flat because the associated cost values are large, which means their pixels are not close to the best fit planes. In other words, the corresponding landing surface portion is not flat, or not sufficiently flat.

At block 630, the movable object further discards candidate areas that are tilted. The tilted candidate areas represent tilted landing surfaces, which are not suitable for a proper landing. In some embodiments, for an individual candidate area, the movable object can compare the direction of a gravity vector (which can determined by, e.g., the IMU) with the direction of a normal vector of the best fit plane of the candidate area. If the angle between the directions of the gravity vector and the normal vector exceeds a threshold value, the corresponding landing surface is too tilted to be used for landing.

At block 640, the movable object can apply a smoothing function to adjust the cost functions of individual remaining candidate areas such that the adjusted cost functions include information of cost functions of nearby candidate areas. The reason for the smoothing function is that, in at least some embodiments, the goal is not just to pick a candidate area with the least cost function (which means a flat surface), but to pick a candidate area with nearby areas that are also relatively flat. This is beneficial because the UAV or other device may deviate from the planned path during the landing, and may land on a nearby area instead of the picked candidate area. Therefore, picking a candidate area with nearby areas that are also relatively flat reduces the chances for damaging the UAV during landing.

Figure 7:
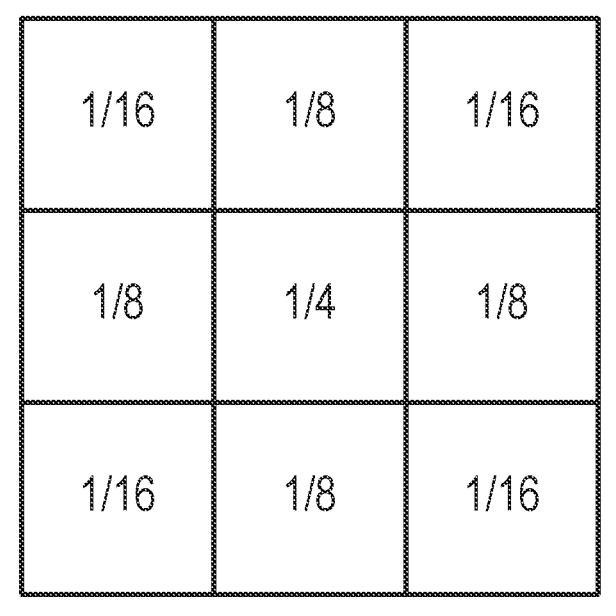

In some embodiments, the smoothing function can be, e.g., a Gaussian blur function. For example, FIG. 7 is a partially schematic illustration of a Gaussian blur filter, in accordance with a representative embodiment of the present technology. The 3 by 3 Gaussian blur filter illustrated in FIG. 7 can be applied to, e.g., block 640 of process 600. As shown in FIG. 7, the Gaussian blur filter takes ¼ of the original cost function of the candidate area, and ⅛ of cost functions of left, right, upper and lower neighboring areas, as well as 1/16 of cost functions of cornering areas.

Returning to FIG. 6, at block 650, the movable object selects a candidate area with the least cost value calculated from the adjusted cost function as a flat area that corresponds to a target landing spot. The cost value of the adjusted cost function, adjusted by the smoothing function (e.g., a Gaussian blur filter), not only indicates whether the candidate area is flat, but also indicates a degree of flatness for nearby areas. The UAV can then descend to the identified target landing spot according to the process illustrated in FIGS. 4A and 4B.

Figure 8:
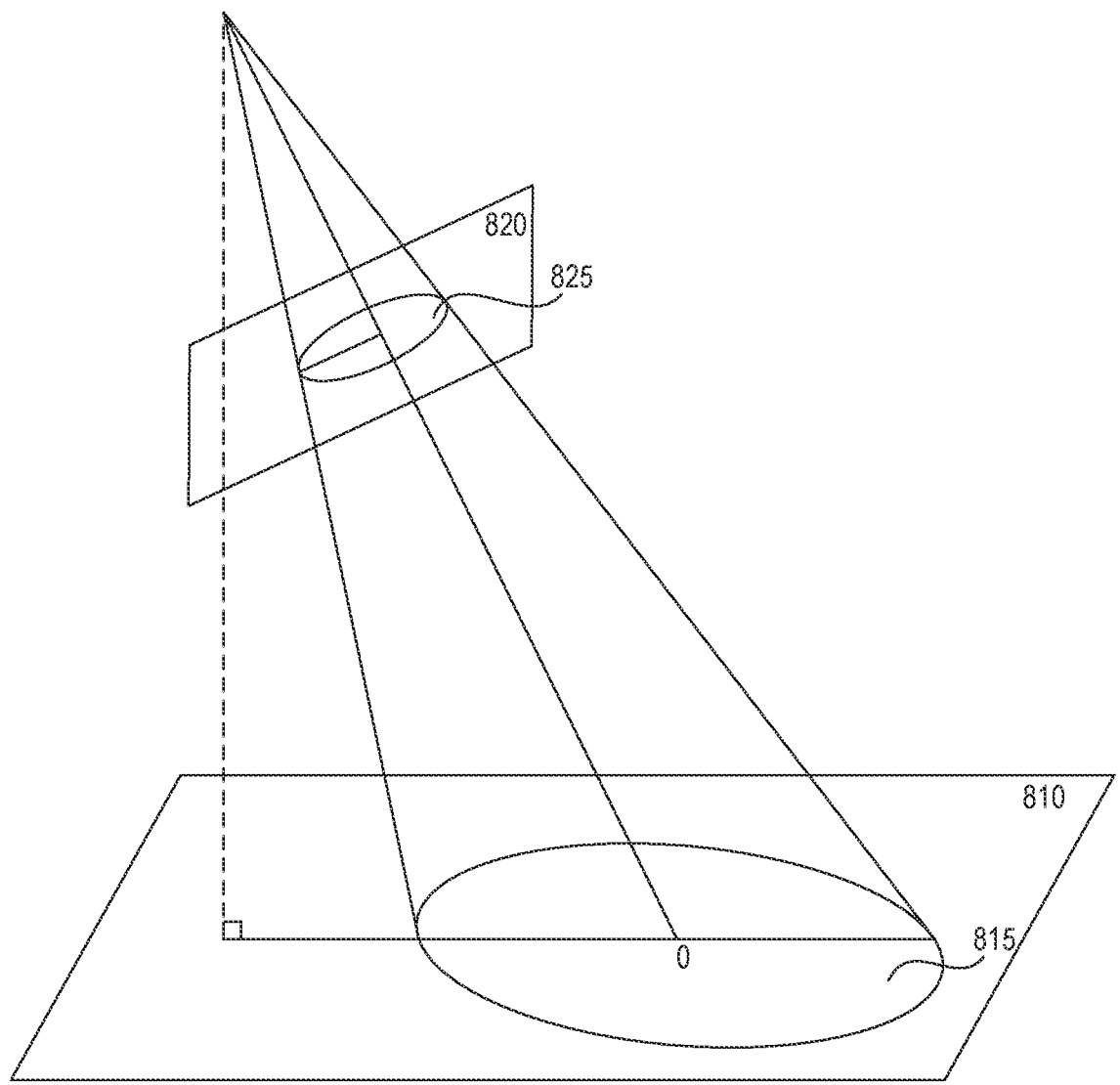
FIG. 8 is a partially schematic illustration of a sample perspective projection, in accordance with a representative embodiment of the present technology.

As the process 400 in FIGS. 4A and 4B illustrates, the movable object can apply a perspective projection to the images if the images not are captured when the UAV is at a horizontal state. FIG. 8 is a partially schematic illustration of a perspective projection, in accordance with a representative embodiment of the present technology. As shown in FIG. 8, a pixel frame 820 of the captured images does not correspond to a landing surface directly below the UAV. The area 825 within the pixel frame 820 has a corresponding perspective projected area 815 on the ground frame 810. In various embodiments, the area 825 can have different shapes, such as circles, ellipses, squares, rectangles, etc. Accordingly, the projected area 815 can have shapes such as circles, ellipses, squares, rectangles, etc. For example, the area 825 can be circular and the projected area 815 can be elliptical.

Assuming [u,v] are coordinates of a pixel within the area 825 within the pixel frame 820, the coordinates of the corresponding point on the perspective projected area 815 are denoted as $[x_w, y_w, z_w]$. The perspective projection operation is:

$$\begin{bmatrix} u \\ v \\ 1 \end{bmatrix} = K \begin{bmatrix} R\ T \end{bmatrix} \begin{bmatrix} x_w \\ y_w \\ z_w \\ 1 \end{bmatrix}.$$

K is the intrinsic matrix, which includes parameters associated with the camera, such as focal length, image sensor format, principal point of the camera lens and lens distortion. R and T include extrinsic parameters, which denote the coordinate system transformation from world coordinates $[x_w, y_w, z_w]$ to camera coordinates [u,v]. R is a rotation matrix. T represents the position of the origin of the world coordinate system expressed in coordinates of the camera-centered coordinate system. If the coordinate system is chosen such that the origin is at the center of the projected area, then $z_w=0$, $x_w^2+y_w^2=1$.

In other words, $y_w=\sqrt{1-x_w^2}$. Thus, $$\begin{bmatrix} u \\ v \\ 1 \end{bmatrix} = K \begin{bmatrix} R\ T \end{bmatrix} \begin{bmatrix} x_w \\ \sqrt{1-x_w^2} \\ 0 \\ 1 \end{bmatrix}.$$

Figure 9:
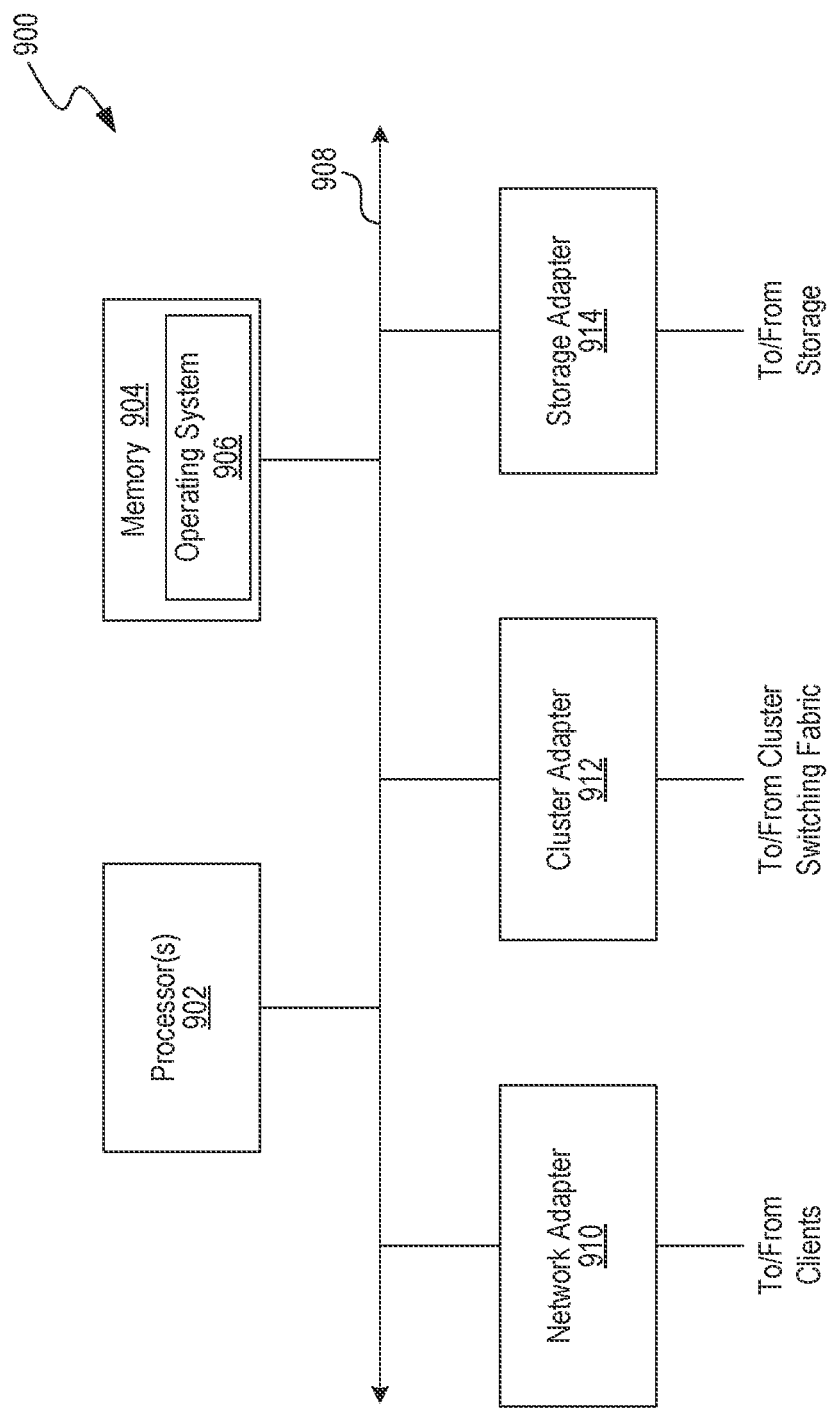
FIG. 9 is a partially schematic illustration of a hardware architecture of a computing device that performs the above processes, in accordance with representative embodiments of the present technology.

FIG. 9 is a partially schematic illustration of a hardware architecture of a computing device that can perform the above processes, in accordance with representative embodiments of the present technology. The computing device 900 can execute some or all of the processor executable process steps that are described below in detail. In various embodiments, the computing device 900 includes a processor subsystem that includes one or more processors 902. Processor 902 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 900 can further include a memory 904, a network adapter 910, a cluster access adapter 912 and a storage adapter 914, all interconnected by an interconnect 908. Interconnect 908 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (I9E) standard 1394 bus (sometimes referred to as "Firewire") or any other data communication system.

The cluster access adapter 912 includes one or more ports adapted to couple the computing device 900 to other devices. In the illustrated embodiment, Ethernet can be used as the clustering protocol and interconnect media, although other types of protocols and interconnects may be utilized within the cluster architecture described herein.

The computing device 900 can be embodied as a single- or multi-processor system executing an operating system 906 that can implement a high-level module, e.g., a manager, to logically organize the information as a hierarchical structure of named directories, files and special types of files called virtual disks at the storage devices. The computing device 900 can further include graphical processing unit(s) for graphical processing tasks or processing non-graphical tasks in parallel.

The memory 904 can comprise storage locations that are addressable by the processor(s) 902 and adapters 910, 912, and 914 for storing processor executable code and data structures. The processor 902 and adapters 910, 912, and 914 may, in turn, comprise processing elements and/or logic circuitry configured to execute the software code and manipulate the data structures. The operating system 906, portions of which are typically resident in memory and executed by the processor(s) 902, functionally organizes the computing device 900 by (among other things) configuring the processor(s) 902 to invoke. It will be apparent to those skilled in the art that other processing and memory implementations, including various computer readable storage media, may be used for storing and executing program instructions pertaining to the technology.

The network adapter 910 can include multiple ports to couple the computing device 900 to one or more clients over point-to-point links, wide area networks, virtual private networks implemented over a public network (e.g., the Internet) or a shared local area network. The network adapter 910 thus can include the mechanical, electrical and signaling circuitry needed to connect the computing device 900 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 914 can cooperate with the operating system 906 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 914 can include multiple ports having input/output (I/O) interface circuitry that couples to the disks over an I/O interconnect arrangement, e.g., a conventional high-performance, Fibre Channel (FC) link topology. In various embodiments, the cluster adapter 912 and the storage adapter 914 can be implemented as one adapter configured to connect to a switching fabric, e.g., a storage network switch, in order to communicate with other devices and the mass storage devices.

One feature of several of the embodiments described above is that the UAV can automatically evaluate or measure a landing surface using computer visualization technologies. The UAV can use its visual sensors such as cameras to measure the landing surface, e.g., using stereo matching techniques. The depth information can be extracted from the images and used for reconstructing the 3D terrain and selecting the target landing spot. An advantage of this arrangement is that the UAV can automatically and efficiently identify a target landing spot without intervention by a human operator. Thus, the UAV can properly descend to the landing spot without damaging itself due to an uneven or tilted landing surface.

From the foregoing, it will be appreciated that specific embodiments of the technology have been described herein for purposes of illustration, but that various modifications may be made without deviating from the technology. For example, the terrain measurement technology can be applied devices other than UAVs, e.g., manned aircraft, autonomous cars, self-balancing vehicles, robots, wearable devices such as smart glasses, virtual reality (VR) or augmented reality (AR) had-mounted display. For instance, an autonomous car or a robot can include one or more cameras for capturing images of the land surface in front of the autonomous car or robot. The autonomous car or robot measures the terrain condition by extracting the depth information from the images. Based on the terrain condition, the autonomous car or robot automatically selects a route with a smooth driving surface.

The landing site is described above in the content of several embodiments as including the ground. In other embodiments, the landing site can include objects (e.g., a boat, vehicle, or platform), water, or other suitable sites.

The present technology can also be directed generally to wearable devices such as smart glasses, virtual reality (VR) or augmented reality (AR) head-mounted displays, etc. The technology can automatically measure or otherwise evaluate the terrain of a surface in front of such a wearable device or a user wearing the wearable device and identify a target surface that is suitable for the user to travel. The technology can further indicate the target surface to the user using the wearable device or other devices that are capable of outputting the information of the target surface to the user.

Certain aspects of the technology described in the context of particular embodiments may be combined or eliminated in other embodiments. For example, in some embodiments, the UAV does not need to discard a tilted candidate area, if the UAV is capable of landing on a tilted surface. In some embodiments, the UAV does not need to apply perspective projection to captured images, if the UAV is equipped with a mechanism to automatically orient the camera(s) to capture images downward, regardless of the flight attitude of the UAV. In other embodiments, the UAV does not apply a smoothing function to the cost functions of the candidate areas, e.g., if the UAV is capable of descending down to a landing spot in an accurate manner.

Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

To the extent any materials incorporated herein conflict with the present disclosure, the present disclosure controls.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. A computer-implemented method for controlling landing of a movable object, comprising:
    receiving a request to land the movable object on a surface;
    in response to the request, obtaining a depth map of the surface, each pixel of the depth map corresponding to a portion of the surface;
    controlling the movable object to land based on flatness or tilt of the depth map.

2. The computer-implemented method of claim 1, wherein obtaining the depth map of the surface comprises:
    performing a stereo matching on images captured by two cameras at the same time or two sequential images captured by a single camera.

3. The computer-implemented method of claim 1, wherein a distance sensor is used to obtain the depth map of the surface.

4. The computer-implemented method of claim 1, further comprising:
    determining a fitting plane based on position information and depth information of each pixel in the depth map;
    determining the flatness as a deviation of the depth map from the fitting plane; and
    determining the tilt of the depth map based on an angle between a normal vector normal to the fitting plane and a gravity vector extending in a direction of gravity.

5. The computer-implemented method of claim 1, wherein controlling the movable object to land based on the flatness or tilt of the depth map comprises:
    determining whether the surface meets one or more landing conditions based on the flatness or tilt of the depth map;
    controlling the movable object to stop landing when the one or more landing conditions are not met.

6. The computer-implemented method of claim 5, wherein controlling the movable object to stop landing comprises:
    guiding the movable object to another location to identify a possible landing site.

7. The computer-implemented method of claim 5, wherein controlling the movable object to land based on the flatness or tilt of the depth map further comprises:
    controlling the movable object to continue landing when the one or more landing conditions are met.

8. The computer-implemented method of claim 1 further comprising:
    controlling the movable object to descend to a predetermined height before obtaining the depth map.

9. The computer-implemented method of claim 8, wherein the depth map is obtained based on an image captured by a bottom-viewing camera when the movable object is at the predetermined height.

10. The computer-implemented method of claim 9, wherein the predetermined height is determined based on a pixel resolution of the bottom-viewing camera.

11. An unmanned aerial vehicle (UAV) apparatus, comprising:
a plurality of motors;
a plurality of propellers;
a controller programmed with instructions that, when executed:
receive a request to land the UAV apparatus on a surface;
in response to the request, obtain a depth map of the surface, each pixel of the depth map corresponding to a portion of the surface;
control the UAV apparatus to land based on flatness or tilt of the depth map.

12. The unmanned aerial vehicle apparatus of claim 11, wherein
obtaining the depth map of the surface comprises:
performing a stereo matching on images captured by two cameras at the same time or two sequential images captured by a single camera.

13. The unmanned aerial vehicle apparatus of claim 11, wherein a distance sensor is used to obtain the depth map of the surface.

14. The unmanned aerial vehicle apparatus of claim 11, wherein the instructions, when executed:
determine a fitting plane based on position information and depth information of each pixel in the depth map;
determine the flatness as a deviation of the depth map from the fitting plane; and
determine the tilt of the depth map based on an angle between a normal vector normal to the fitting plane and a gravity vector extending in a direction of gravity.

15. The unmanned aerial vehicle apparatus of claim 11, wherein controlling the UAV apparatus to land based on the flatness or tilt of the depth map comprises:
determining whether the surface meets one or more landing conditions based on the flatness or tilt of the depth map;
controlling the UAV apparatus to stop landing when the one or more landing conditions are not met.

16. The unmanned aerial vehicle apparatus of claim 15, wherein controlling the UAV apparatus to stop landing comprises:
guiding the UAV apparatus to another location to identify a possible landing site.

17. The unmanned aerial vehicle apparatus of claim 15, wherein controlling the UAV apparatus to land based on the flatness or tilt of the depth map further comprises:
controlling the UAV apparatus to continue landing when the one or more landing conditions are met.

18. The unmanned aerial vehicle apparatus of claim 11, wherein the instructions, when executed:
control the UAV apparatus to descend to a predetermined height before obtaining the depth map.

19. The unmanned aerial vehicle apparatus of claim 18, wherein the depth map is obtained based on an image captured by a bottom-viewing camera when the UAV apparatus is at the predetermined height, wherein the predetermined height is determined based on a pixel resolution of the bottom-viewing camera.

20. A non-transitory computer-readable medium storing instructions that, when executed, cause one or more processors to perform a method for controlling landing of a movable object, the method comprising:
receiving a request to land the movable object on a surface;
in response to the request, obtaining a depth map of the surface, each pixel of the depth map corresponding to a portion of the surface;
controlling the movable object to land based on flatness or tilt of the depth map.

* * * * *